July 14, 1925.
F. H. BEALL ET AL
1,546,191
PROCESS FOR THE MANUFACTURE OF NITROBENZOIC ACID
Filed Sept. 5, 1923
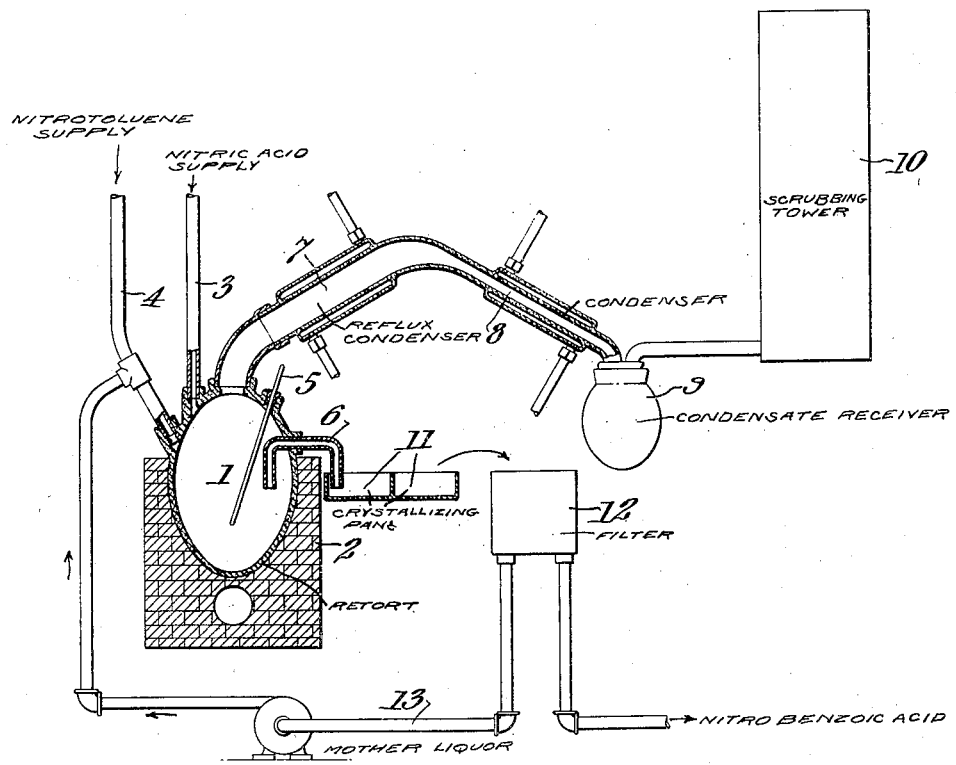
Inventors:
Frank H. Beall
Donald Ryal Bradner
By Byrnes Townsend & Brickenstein
their Attorneys.

Patented July 14, 1925.

1,546,191

UNITED STATES PATENT OFFICE.

FRANK H. BEALL, OF NEWARK, NEW JERSEY, AND DONALD BYAL BRADNER, OF EDGEWOOD, MARYLAND.

PROCESS FOR THE MANUFACTURE OF NITROBENZOIC ACID.

Application filed September 5, 1923. Serial No. 661,112.

*To all whom it may concern:*

Be it known that we, (1) FRANK H. BEALL and (2) DONALD BYAL BRADNER, citizens of the United States, residing at (1) Newark, (2) Edgewood, in the counties of (1) Essex, (2) Harford, and States of (1) New Jersey, (2) Maryland, have invented certain new and useful Improvements in Processes for the Manufacture of Nitrobenzoic Acid, of which the following is a specification.

In our Patent No. 1,488,730 dated April 1, 1924, we have described a process for the oxidation of organic compounds by means of nitric acid. That process as it is particularly described in connection with the oxidation of nitrotoluene to nitrobenzoic acid consists generally in treating nitrotoluene with nitric acid under certain controlled conditions of temperature, concentration, etc., until the reaction has proceeded to the desired extent, and then separating the nitrobenzoic acid from the reaction mixture.

The present invention relates to a modification or extension of the process described in said application and consists generally in treating the organic compound to be oxidized with nitric acid while maintaining the reaction conditions favorable to the desired reaction, stopping the reaction when only a relatively small proportion of the organic compound has been converted to the desired oxidation product, separating the oxidation product from the remainder of the reaction mixture including unoxidized organic compound and secondary reaction products, and re-treating the said remainder of the reaction mixture, thereby maintaining a relatively low concentration of the oxidation product in the reaction mixture. The process is particularly designed for the oxidation of nitrotoluenes to nitrobenzoic acids, but is applicable for the oxidation of other organic compounds susceptible to oxidation by nitric acid, for instance, such aromatic organic compounds as contain alkyl or aliphatic side chains or groupings.

As will be apparent from the foregoing outline of the process, it is capable of being carried out in batch operation, but it is particularly well adapted to continuous operation, which method of operation is preferred and will be described hereinafter by way of illustration in connection with its application for the oxidation of o-nitrotoluene to o-nitrobenzoic acid.

For the oxidation of nitrotoluenes to nitrobenzoic acids practically any strength of nitric acid may be used. However, the action of nitric acid of a strength of less than 20 percent has been found to be too slow for industrial operation, while acid approaching 100 percent strength ordinarily is not available at moderate cost. A practical range of strengths of the acid is from 20 to 70 percent, acid of from 50 to 55 percent strength, that is, ordinary tower recovery acid, being preferred. The temperature at which the reaction may be carried out may vary within a rather wide range from say 120° C., below which temperature the reaction rate is too slow, up to about 190° C., above which temperature excessive distillation of nitrotoluene from the reaction mixture occurs. A suitable operating temperature is from 155 to 165° C.

A feature of the process is that it may be, and preferably is, carried out at atmospheric pressure.

In the accompanying drawings we have illustrated one form of apparatus suitable for carrying out the process.

Referring to the drawing, 1 is a retort which may be made of chemical stoneware or other suitable acid-resistant material mounted in a furnace setting 2. The retort is provided with a nitric acid supply pipe 3, a nitrotoluene supply pipe 4, a thermometer 5, and a discharge pipe 6, and communicates at its upper end with the reflux condenser 7. Beyond the reflux condenser 7 is a condenser 8, a receiving vessel for condensate 9, and a scrubbing tower 10. The discharge pipe 6 empties into cooling pans 11, the material cooled therein passing to the filter or centrifuge 12, from which solid material is discharged as final product or for further treatment as indicated, while the separated liquid is conveyed by the pipe 13 to the nitrotoluene supply pipe 4.

In carrying out the process in accordance with an illustrative example, the retort 1 is charged with o-nitrotoluene through the pipe 4 and heated to say 155 to 165° C., and nitric acid of say 50 to 55 percent strength is fed in until the reaction mixture comes to a uniform boil. The reaction is then continued and maintained by supplying nitric acid and nitrotoluene as required, and the nitrobenzoic acid content of the reaction mixture is maintained at the desired figure by withdrawing a portion of the reaction mixture through the pipe 6, cooling to crystallize a nitrobenzoic acid in the crystallizing pans 11, separating the crystals by filtration or centrifuging in the apparatus 12 and returning the mother liquor to the retort through the pipes 13 and 14. The gases and vapors evolved from the charge consisting principally of water, nitric acid, oxides of nitrogen, and nitrotoluene pass to the reflux condenser 7 in which a part of the nitrotoluene and nitric acid is condensed and returned to the retort. The nitrobenzoic acid separated from the mother liquor preferably is washed with a small amount of nitrotoluene and discharged as final product, the washings being delivered to the retort.

The reaction conditions are controlled and maintained by suitable manipulation of the several operations involved which include the supply of external heat and of fresh nitric acid to the retort and the reflux to the retort. The supply of nitrotoluene to the retort for continuous operation of course is equal to the quantity used up by the reaction, and the supply of mother liquor and wash liquor to the retort is fairly constant, but the supply of fresh nitric acid, the reflux to the retort and the supply of external heat are variable. The reflux condenser preferably is operated so as to return to the retort the bulk of the distilled nitrotoluene and a relatively strong fraction of the nitric acid distilled, say acid of about the same strength as the fresh acid supply, while weaker acid and some nitrotoluene and oxides of nitrogen pass on to the condenser 8 and tower 10. If the temperature of the reaction mixture tends to fall or the rate of reaction to become too slow the concentration of the nitric acid reflux may be increased, or if the temperature of the reaction mixture tends to rise and the rate of reaction to become too rapid the concentration of the nitric acid reflux is decreased. The supply of external heat to the retort may also be varied to increase or decrease the rate of reaction, the higher the temperature the greater the reaction rate. The concentration of the fresh nitric acid supply may also be varied for the purpose of controlling the reaction.

The supply of fresh nitric acid may be substituted wholly or in part by a mixture of nitrogen peroxid and air. It is also desirable, even when only nitric acid is used, to supply some air or oxygen to the retort, thus causing a more effective utilization of the nitric acid.

The extent to which the nitrobenzoic acid content of the charge is permitted to build up may vary within a rather broad range. The upper limit for practical operation will be determined by the maximum concentration of nitrobenzoic acid at which, after cooling and crystallization, the mixture is fluent and can be pumped and filtered or centrifuged. If too much nitrobenzoic acid is present the reaction mixture upon cooling will solidify to a non-fluent mass. The lower limit of the nitrobenzoic acid concentration will be determined by practical considerations, it being of course desirable to obtain as much of the product as is possible by the treatment of a given quantity of the reaction mixture. A nitrobenzoic acid content of 15 to 20 percent in the reaction mixture has been found to give satisfactory results and is preferred under present operating conditions. From about 5 to 35 percent appears to be a practical range.

The theory upon which the process is based is as follows, it being understood, however, that the invention is not limited to any particular theory regarding the reaction involved. Apparently, at the beginning of the reaction, that is, when the reaction mixture contains only nitric acid and nitrotoluene, the formation of nitrobenzoic acid takes place along with a relatively rapid formation of secondary reaction products or intermediates. After the concentration of the intermediate or secondary reaction products has reached a certain point the quantity thereof in the reaction mixture increases only slowly. This may be explained in several ways, to wit: (1) that the rate of formation of intermediates is slightly more rapid than the rate of the conversion of the intermediates to nitrobenzoic acid, (2) that the intermediates are converted to nitrobenzoic acid as fast as they form after a certain concentration is reached, but that there is a gradual building up of another secondary reaction product in the reaction mixture. In any event it appears that the limitation of the nitrobenzoic acid content of the reaction mixture by continuously or intermittently removing all or a part of it either accelerates the conversion of intermediates to nitrobenzoic acid with respect to the rate of formation of intermediates, or the formation of nitrobenzoic acid is accelerated with respect to the formation of secondary reaction products, and as a result the production of nitrobenzoic acid is proportionately greater than the production of other undesired compounds in the reaction mixture. In practice the process may be carried on for a long time, almost continuously without interference by undesired reaction products in the reaction mixture. Nitrobenzoic acid in quantity amounting to 400 to 500 percent of the quantity theoretically equivalent to the original charge of nitrotoluene can be produced before the quantity of undesired reaction products in the charge reaches a point at which such products tend to separate with the nitrobenzoic acid. When this point has been reached the process may either be started anew with fresh nitrotoluene or preferably the quantity of undesired products in the charge is reduced to about the quantity formed in the initial cycle of operations and the process continued. Thus after 400 to 500 percent of nitrobenzoic acid has been produced, that is, after say about 20 to 25 repetitions of the batch operation, each operation producing say 20 percent of nitrobenzoic acid calculated on the quantity of nitrotoluene in the charge, or after an equivalent continuous run, that is, after the process has been run continuously until nitrobenzoic acid in quantity amounting to 400 to 500 percent of the equivalent of the quantity of nitrotoluene in the charge has been produced, the charge is withdrawn from the retort and the nitrobenzoic acid is separated by crystallization and filtering and the mother liquor is treated with sodium carbonate or caustic soda solution or simply washed with hot water in quantity sufficient to reduce its content of undesired products to the desired extent, say about equal to the quantity resulting from an initial 20 percent conversion, and the purified mother liquor is then returned to the process. The residue of undesired reaction products left in the mother liquor apparently retards the further formation of such products, so that in the reuse of this mother liquor there is only a slow building up of such products, as in the repetitions of the process following the initial operation as described above.

We claim:

1. Method of oxidizing organic compounds which comprises treating a quantity of the compound to be oxidized with nitric acid until only a relatively small proportion thereof is converted to the desired oxidation product, separating a portion of said oxidation product from the reaction mixture, and retreating the mother liquor.

2. Method of making nitrobenzoic acids which comprises, treating a quantity of a nitrotoluene with nitric acid until only a relatively small proportion thereof is converted to the corresponding nitrobenzoic acid, separating a portion of the nitrobenzoic acid from the reaction mixture, and retreating the mother liquor.

3. Process of oxidizing organic compounds which comprises, reacting upon an organic compound with nitric acid and removing oxidation product from the reaction mixture during the course of the reaction whereby the oxidation product content of the mixture is maintained below a predetermined maximum.

4. Process of making nitrobenzoic acids which comprises, oxidizing a nitrotoluene with nitric acid and maintaining the nitrobenzoic acid content of the reaction mixture below a predetermined maximum during the course of the reaction by the removal of nitrobenzoic acid from the reaction mixture.

5. Process of oxidizing organic compounds which comprises, heating a body of a mixture of an organic compound and nitric acid to reacting temperature, withdrawing a portion of the reaction mixture during the course of the reaction and separating oxidation product therefrom, and returning the mother liquor to said body.

6. Process of making nitrobenzoic acids which comprises, heating a body of a mixture of a nitrotoluene and nitric acid to reacting temperature, withdrawing a portion of the reaction mixture and separating nitrobenzoic acid therefrom and returning the mother liquor to said body.

7. Process of making nitrobenzoic acids which comprises, heating a body of a mixture of a nitrotoluene and nitric acid to reacting temperature, continuously withdrawing a portion of the reaction mixture and separating nitrobenzoic acid therefrom at a rate substantially equivalent to the rate of formation of nitrobenzoic acid in the reaction mixture, and returning the mother liquor to said body.

8. Process of making nitrobenzoic acids which comprises, maintaining a mixture containing a nitrotoluene and nitric acid of at least 20 per cent strength at a temperature of from 120 to 190° C., and withdrawing nitrobenzoic acid from said reaction mixture at substantially the rate of formation of said acid in said reaction mixture.

9. Process of making o-nitrobenzoic acid which comprises, reacting upon o-nitrotoluene with nitric acid until the nitrobenzoic acid content of said mixture is from 5 to 35 per cent, cooling a portion of said reaction mixture and separating crystallized nitrobenzoic acid therefrom, and returning the resulting mother liquor to the reaction.

10. Process of making nitrobenzoic acids which comprises, heating a body of a nitrotoluene to reacting temperature with nitric acid, supplying nitric acid to said body of nitrotoluene at a rate sufficient to maintain a uniform boiling of the reaction mixture, and removing nitrobenzoic acid from the reaction mixture at a rate sufficient to maintain the nitrobenzoic acid content thereof at from 5 to 35 per cent.

11. Process as defined in claim 10 in which nitrobenzoic acid is removed from the reaction mixture by cooling a portion thereof and filtering the same.

12. Process of making o-nitrobenzoic acid which comprises, forming a mixture of $o$-nitrotoluene and nitric acid and containing sufficient nitric acid to maintain the mixture at a uniform boil at a reacting temperature, continuously supplying nitric acid and $o$-nitrotoluene to said mixture, and separating $o$-nitrobenzoic acid from said mixture at a rate sufficient to maintain the $o$-nitrobenzoic acid content thereof insufficient to cause said mixture to set to a solid mass under the conditions under which the separation of nitrobenzoic acid is carried out.

13. Process of making nitrobenzoic acids which comprises, alternately and successively reacting upon a body of $o$-nitrotoluene with nitric acid until the nitrobenzoic acid content thereof is from 5 to 35 percent and separating a portion of the nitrobenzoic acid content of said mixture until the secondary reaction products content of said mixture reaches a point at which said products tend to contaminate the separated nitrobenzoic acid, removing a portion of said secondary reaction products from said mixture, and repeating the cycle of operation.

14. Process of oxidizing $o$-nitrotoluene which comprises, alternately and successively reacting upon $o$-nitrotoluene with nitric acid and separating $o$-nitrobenzoic acid from the reaction mixture until the secondary reaction products content of said mixture reaches a point at which said products tend to contaminate the separated $o$-nitrobenzoic acid, reducing the secondary reaction products content of said mixture, and repeating the alternate and successive reaction with nitric acid and separation of the nitrobenzoic acid.

15. Process of making $o$-nitrobenzoic acid which comprises maintaining a body of a reaction mixture containing $o$-nitrotoluene and nitric acid at a uniform boil, and continuously isolating a portion of the reaction mixture and separating $o$-nitrobenzoic acid therefrom and returning the mother liquor to said body until a point is reached at which secondary reaction products separate with the nitrobenzoic acid, stopping the reaction and separating secondary reaction products from the reaction mixture, and repeating the cycle of operations.

In testimony whereof, we affix our signatures.

FRANK H. BEALL.
DONALD BYAL BRADNER.